(12) United States Patent
  Koch

(10) Patent No.: US 12,669,199 B2
(45) Date of Patent: Jun. 30, 2026

(54) COUPLING DEVICE

(71) Applicant: Flecotec AG, Badenweiler (DE)

(72) Inventor: Martin Koch, Neuenburg (DE)

(73) Assignee: FLECOTEC AG, Badenweiler (DE)

( * ) Notice: Subject to any disclaimer, the term of this patent is extended or adjusted under 35 U.S.C. 154(b) by 0 days.

(21) Appl. No.: 18/872,200

(22) PCT Filed: May 17, 2023

(86) PCT No.: PCT/EP2023/063360

§ 371 (c)(1),
(2) Date: Dec. 5, 2024

(87) PCT Pub. No.: WO2024/002580

PCT Pub. Date: Jan. 4, 2024

(65) Prior Publication Data

US 2026/0055834 A1      Feb. 26, 2026

(30) Foreign Application Priority Data

Jun. 30, 2022    (DE) ..................... 10 2022 002 382.2

(51) Int. Cl.
  F16L 33/12          (2006.01)
(52) U.S. Cl.
  CPC ................................... F16L 33/12 (2013.01)
(58) Field of Classification Search
  CPC ................................. F16L 33/12; F16L 23/06
  See application file for complete search history.

(56) References Cited

U.S. PATENT DOCUMENTS

| | | | |
|---|---|---|---|
| 2,770,439 A | 11/1956 | Stafford et al. ................. | 177/73 |
| 3,738,430 A | 6/1973 | Livingston | |
| 4,843,686 A * | 7/1989 | Bartholomew ......... | F16L 33/12 |
| 9,079,726 B2 | 7/2015 | Brimson | |
| 10,550,977 B1 * | 2/2020 | Hinkle .................... | F16L 21/06 |
| 2005/0084181 A1 | 4/2005 | Koch | |
| 2024/0301977 A1 | 9/2024 | Koch | |

FOREIGN PATENT DOCUMENTS

| | | | | |
|---|---|---|---|---|
| CA | 3044118 A1 * | 11/2019 | ............. | F16L 33/12 |
| DE | 4006785 A1 | 9/1990 | | |
| DE | 102021105817.1 | 6/2022 | | |
| EP | 1441953 B1 | 12/2005 | | |
| WO | 2016/142432 A1 | 9/2016 | | |

OTHER PUBLICATIONS

Search Report for International Application No. PCT/EP2023/063360, 4 pages, Aug. 9, 2023.

* cited by examiner

*Primary Examiner* — Zachary T Dragicevich
(74) *Attorney, Agent, or Firm* — Slayden Grubert Beard PLLC

(57)          ABSTRACT

A coupling device, having at least one coupling part which has an actuating device which actuates a closure part, wherein a flexible line part having a free cross section can be connected to the coupling part. The closure part, in its actuated position, opens up the free cross section of the line part and, in a further actuated position, closes said cross section, wherein the closure part has a flexible diaphragm.

18 Claims, 3 Drawing Sheets

COUPLING DEVICE

CROSS-REFERENCE TO RELATED APPLICATIONS

This application claims priority to German Patent Application No. DE 10 2022 002 382.2, filed on Jun. 30, 2022 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure. The disclosure relates to a coupling device having at least one coupling element which comprises an actuating device that actuates a closure part, wherein a flexible conduit portion comprising a free cross-section can be connected to the coupling element and wherein the closure part, in its actuated position, releases the free cross-section of the conduit portion and closes this cross-section in a further actuated position.

EP 1 441 953 B1 discloses a sealed docking or coupling device, comprising two coupling elements that can be made to fit tightly against each other, between two receptacles that are substantially insulated from the environment, wherein each receptacle can be or is connected substantially flexibly, at least in parts, particularly in the manner of a sack, as well as tightly, to one of the coupling elements respectively in order to be, or be capable of being, tightly sealed or opened when the coupling elements are made to fit tightly against one another. In this case, each coupling element used can be elastically deformed for opening and closing.

SUMMARY

A need exists to provide an improved coupling device. The need is addressed by the subject matter of the independent claim(s). Embodiments of the invention are described in the dependent claims, the following description, and the drawings.

DESCRIPTION

Figure 1:
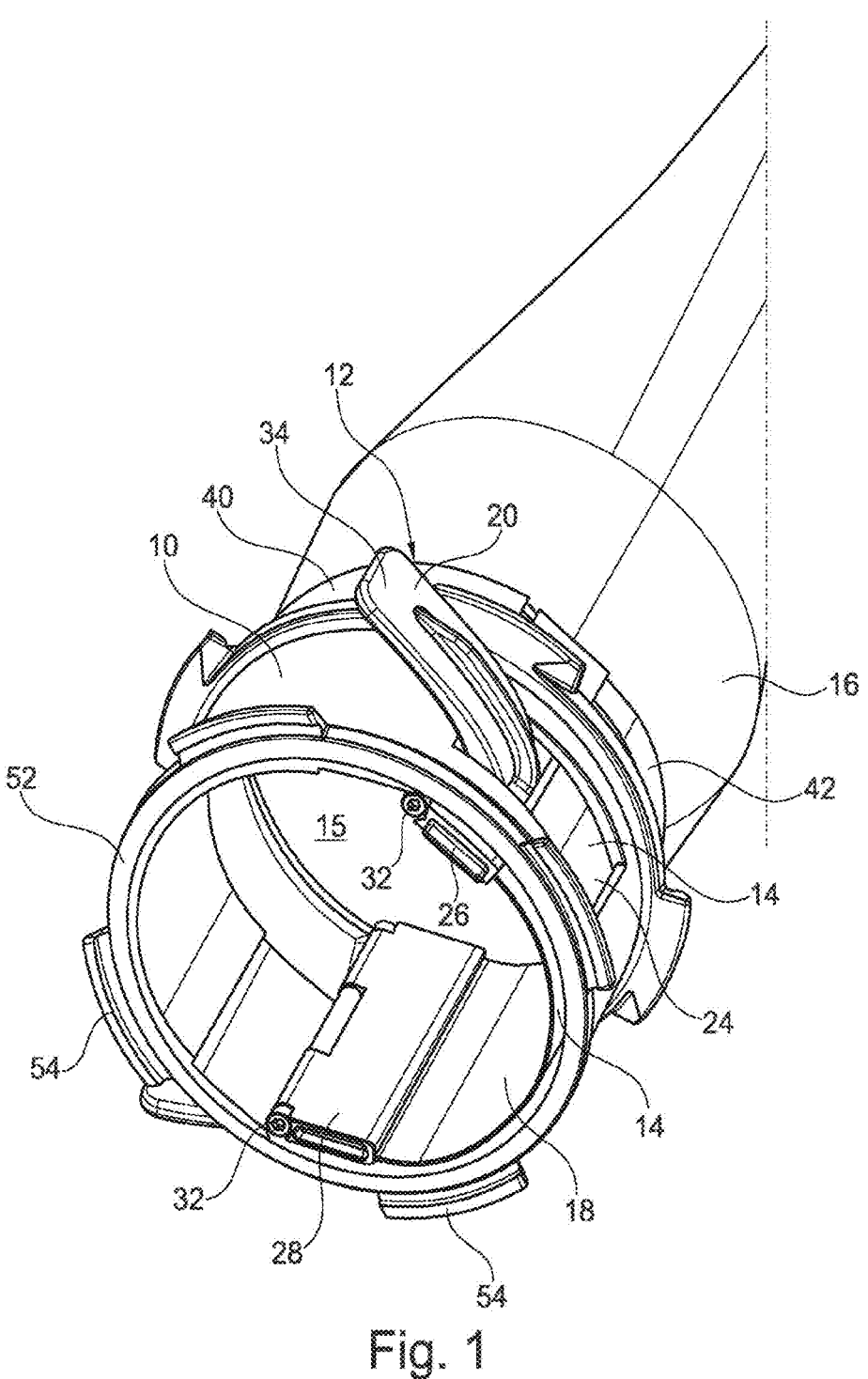
FIG. 1 is a perspective view from beneath an example coupling device in an actuated state, in which the free cross-section of the associated coupling element is held open with the adjoining conduit portion.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description. According to the teachings herein, it is provided that the closure part comprises a flexible membrane. If the membrane, which is designed to be flexible, releases the free cross-section of the conduit portion when said membrane is in its actuated position, said conduit portion is completely released such that a material can be transported substantially without obstruction through the respective coupling element, in particular components of the coupling device do not pass through the released cross-section, said components in this case being connected to the free cross-section at the edges and leaving the passage free and partially surrounding said cross-section. This also prevents the product to be transported from being able to accumulate on the coupling device in the form of residual impurities.

Minimal actuating forces are required to actuate the closure part in the form of the flexible membrane and due to the inherent elasticity of the membrane, it supports the transition from one position to the other. This has no parallel in the prior art.

In some embodiments, it is provided that the flexible membrane can be actuated by the actuating device from one actuated position after passing in a waveform manner through the inside of the coupling element into the further actuated position, which lies opposite the first actuated position. Thanks to the waveform, an inherently stable behaviour is achieved for the transition movement of the membrane between its end positions, facilitating actuation with minimal manual forces. The inherent elasticity of the membrane also allows the membrane to reach its respective end position clamping the hose-shaped conduit portion after passing through the intermediate position and to be held in a force-locking manner in this end position.

In some embodiments, it is provided that the actuating device comprises at least one lever drive, which at least partially passes through the coupling element at one point and which comprises a fixing element that is pivotally articulated on the coupling element, said fixing element fixing the membrane on one free end thereof. The lever drive with the fixing element combine to create a lever actuating system that, on the one hand, permits actuation into defined end positions of the membrane and, on the other hand, achieves a noticeable preferred direction during actuation which rules out operating errors. Instead of an independent structural fixing element, said element may also be formed by a hinge in which the membrane is movably articulated directly on the inside of the coupling element, for example by forming, injection moulding or as part of manufacturing a 3D component, in which at least the coupling element and the closure part are integral components of one part of the coupling device.

For example, in this case it is provided that not only one end of the membrane, but also the other free end of the membrane, is fixed on the inner circumferential side of the coupling element or for example on a further fixing element, which can be actuated in a pivotable manner with respect to the coupling element by means of a further lever drive, which at least partially passes through the coupling element.

In some embodiments, it is provided that the coupling element is designed as a hollow cylinder, two recesses being provided in the cylinder wall, through each of which a hand lever of the actuating device, said lever being connected to the assignable plate-shaped fixing element, passes in each actuating position, and the two hand levers being able to be pivoted in opposition to move the membrane into both opposite actuating positions. As such, the manual lever actuation is incorporated in the coupling element in a particularly space-saving manner and can be actuated from outside. In particular, the manual levers only pivot into the hollow, cylindrical coupling element as part of their actuation and are otherwise mounted on the wall of the coupling element such that, when transporting a powdered product, such as for example in the form of medication or raw materials for medication, the coupling element is always kept compulsorily free from its free cross-section in one actuation position.

In some embodiments, it is provided that the membrane protrudes over one of the free end faces of the coupling element in one direction to fix the conduit portion. As such, the flexible conduit portion with its free cross-sectional area can be fixed outside the coupling element on said coupling element and on the membrane, for example welded to these components at the edges, such that, once again, the desired free cross-sectional area inside the coupling element in the open actuating position is not adversely affected by the adjacent wall of the tubular conduit portion.

In some embodiments, it is provided that the free opening cross-section of the conduit portion is cylindrical in the connection region with the coupling element in one actuating position and, in the other actuating position, by means of the actuating device, it assumes a closed shell shape, for example a half-shell shape, in which the wall portions of the conduit portion lie on top of another forming a kind of clamping gap. As such, if necessary, the free opening cross section is guaranteed to be held open and, on assuming the closed shell shape, it is guaranteed to be hermetically sealed, with the result that the coupling element can be removed from a coupling apparatus, such as, for example the same coupling element, but can also be reconnected again in its turn, without the transported product in a conduit portion being able to pass unintentionally via the assigned coupling element into the connected coupling device. For example, in this case it is provided that the length of the membrane is selected such that it lies flat on the inside of the cylindrical coupling element in the respective actuated position after passing through the waveform.

The disclosure also relates to a coupling system consisting of two, for example identically designed, coupling devices as described herein in which the two coupling devices are detachably held onto one another in a sealed manner by means of a coupling ring that can be opened and closed. The aforementioned seal may be part of at least one of the coupling devices; alternatively, it is also possible to insert a sealing ring between the two coupling devices at the point at which their end faces lie on top of one another. A corresponding connecting ring is disclosed in DE 10 2021 105 817.1, for example.

Reference will now be made to the drawings in which the various elements of embodiments will be given numerical designations and in which further embodiments will be discussed. The drawings are schematic and not to scale.

Specific references to components, process steps, and other elements are not intended to be limiting. Further, it is understood that like parts bear the same or similar reference numerals when referring to alternate FIGS.

Figures 2, 3:
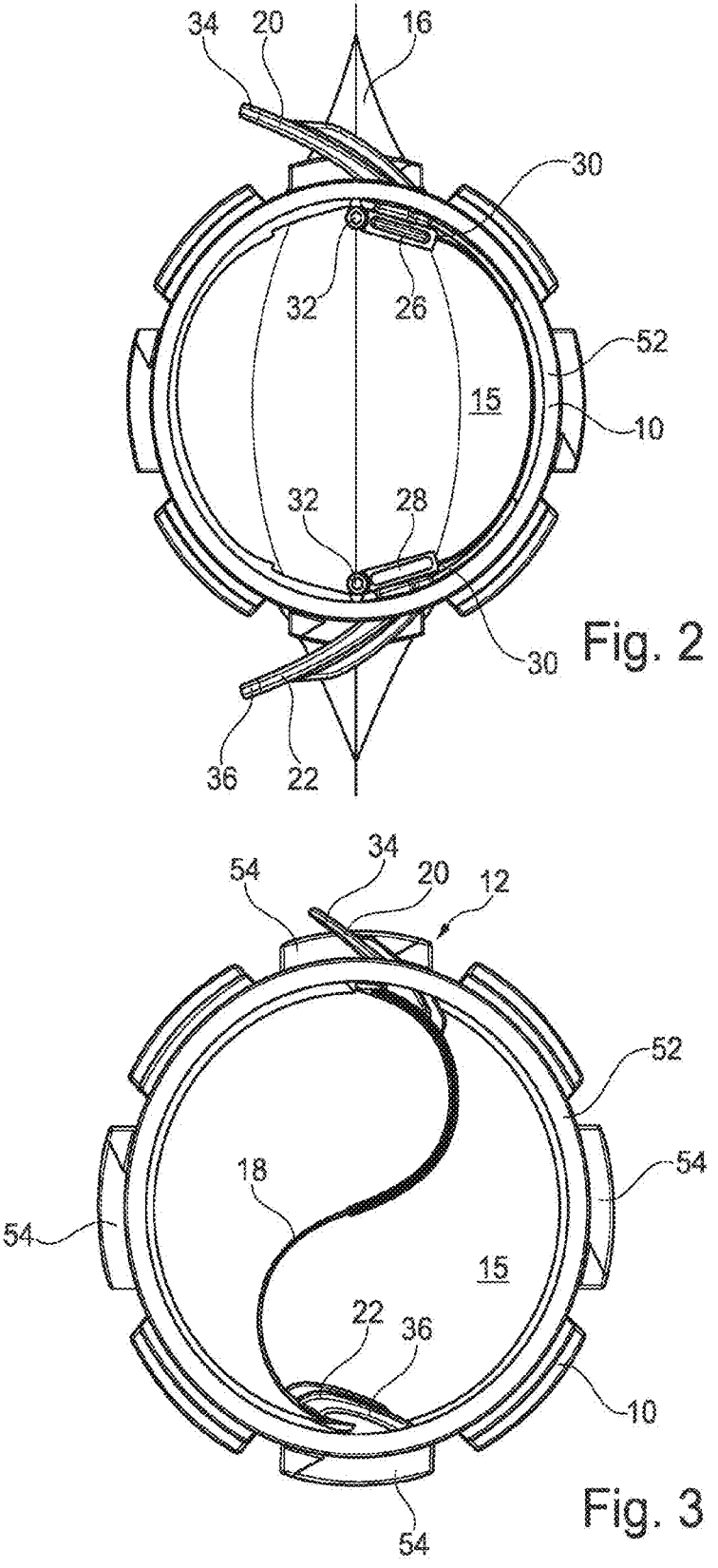
FIG. 2 is an end view from beneath the solution shown in FIG. 1.
FIG. 3 is a view from beneath the example coupling element, corresponding to FIG. 2, with a partly actuated, waveform membrane.

FIG. 1 shows the main elements of the coupling device in its entirety. The coupling device comprises a coupling element 10, which in turn comprises an actuating device referred to in its entirety as 12. The actuating device 12 actuates a closure part 14, a flexible hose-like or tubular conduit portion 16 comprising a free cross-section 15 being connected to the coupling element 10 at its ends. In one actuated position according to FIG. 1, the closure part 14 releases the free cross-section 15 in the manner of a circular surface, and in a further actuated position according to the image shown in FIG. 4, this cross-section 15 is sealed in a clamping manner. As shown in FIG. 3 in particular, in this case the closure part 14 is substantially formed by a flexible membrane 18.

Figures 4, 5:
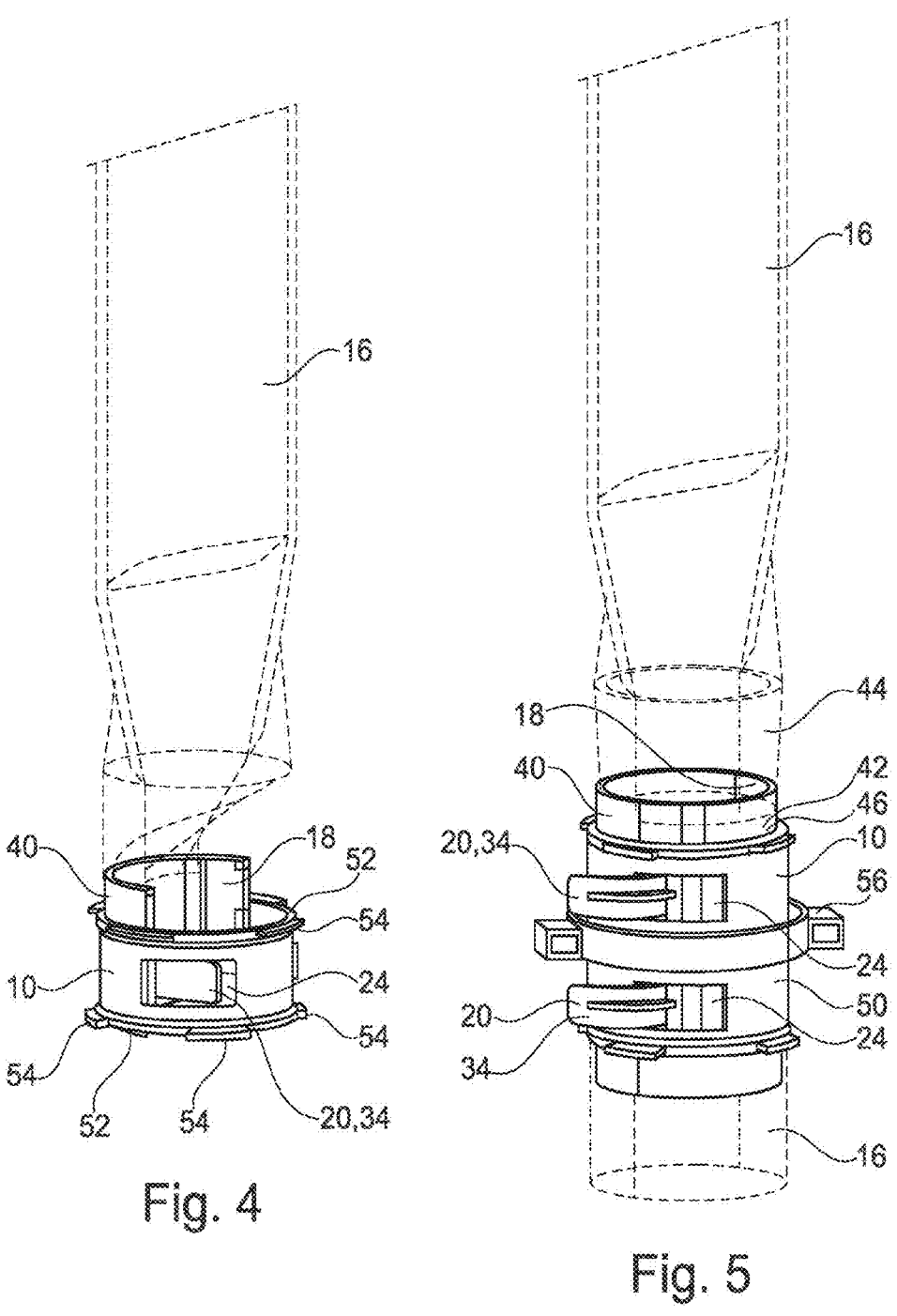
FIG. 4 is a partial perspective view showing a side representation of the example coupling element shown in FIG. 1 to 3, in which the membrane passes from its actuating position shown on the far right in FIG. 2, after passing through the intermediate phase shown in FIG. 3 into its half-shell-shaped clamping and position on the far left, in which the adjoining conduit portion is sealed on its end side.
FIG. 5 shows an example coupling system consisting of two coupling devices laid on top of one another on their end faces as shown in FIG. 1 to 4, said coupling devices being detachably held on top of one another along their connecting region by means of a coupling ring.

As is shown in FIG. 3 in particular, the flexible membrane 18 that can be actuated by means of the actuating device 12 passes from one actuated position after passing in a waveform manner through the hollow, cylindrical coupling element 10 into the further actuated position, which lies opposite the first actuated position. In its open position, the membrane 18, viewed in the direction shown in FIG. 1, is positioned on the far right on the inside of the coupling element 10 and, after passing in a waveform as shown in FIG. 3, the membrane 18 moves into its closed position on the far left as shown in FIG. 4. In this respect, the maximum possible actuating positions of the membrane 18 referred to a notional longitudinal axis of the coupling element 10 lie on opposite sides of the coupling element 10 from each other, the membrane 18 in each case assuming a half-shell shape in the corresponding end position.

As can be also seen from the FIGS., the actuating device 12 comprises a lever drive 20, 22, which at least partially passes through the coupling element 10 at one window-like point 24 in each case and which comprises a fixing element 26, 28 that is pivotally mounted on the coupling element 10, said fixing element fixing the membrane 18 on one free end 30 thereof.

In the embodiment shown, the respective fixing element 26, 28 is formed by a rectangular fixing plate for the membrane 18 and, as a kind of hinge joint, the fixing element 26, 28 is pivotally mounted along a pivot axis 32, which is formed by a fixing bolt that extends parallel to the longitudinal axis of the coupling element 10 over the entire height of the coupling element 10 and on which the fixing element 26, 28 is articulated in a pivotable manner with one plate edge on the end side thereof. From the outside, a stirrup-like hand lever 34, 36 is integrally articulated on the respective fixing element 26, 28 as part of the lever drive 20, 22, which passes through a rectangular window-like recess in the wall of the coupling element 10 as position 24.

Viewed in the direction shown on FIG. 1, if the hand lever 34 is pivoted from its illustrated, non-actuated position in a clockwise direction around the upper pivot axis 32, the hand lever 34, in this pivoting movement, also carries with it the fixing element 26 arranged integrally thereon such that the flat membrane 18 pivots at its end side to the left from its right-hand open original position and, in so doing, in a waveform according to the image in FIG. 3, reduces the free cross-section 15 of the conduit portion 16 until it reaches its clamping actuating position on the far left, as shown in FIG. 4. Actuation can also or alternatively be brought about by means of the other hand lever 36, in this case with an anticlockwise pivoting direction around the associated lower pivot axis 32 shown in FIG. 1. As described, it is, however, also possible to have a single-lever actuation with only one hand lever 34 or 36 and it suffices to connect the membrane with its respective free end 30 directly to the inside of the coupling element 10 as part of a hinge joint (not illustrated). In this respect, in an embodiment that is not shown in greater detail, it is thus also possible to dispense completely with the plate-like fixing elements 26, 28 and the membrane 18 is applied directly to the inside of the coupling element 10, forming a hinge joint. Accordingly, the respective hand lever 34 and/or 36 must then engage directly on the outside of the membrane 18 for manifest actuation. In particular, if the coupling element 10 is manufactured using a 3D printing method, the end side of the membrane 18 can accordingly be applied as an integral part of the coupling element 10 on the inside thereof, the respective end 30 of the free membrane 18 transitioning integrally into the coupling element 10.

For example, all components of the coupling device, such as the coupling element 10 and the lever drive 20 and/or 22, including the membrane 18, are made from suitable plastics materials, which are particularly suitable for transporting foods or pharmaceutical products in particular, such as medication in powder form. As is particularly evident from FIGS. 4 to 5, the edge of the membrane 18 is fixed on the coupling element 10 such that it protrudes over the respective lever drive 20, 22. Furthermore, a wall portion 40 protrudes as a half-shell on the inside of the coupling part 10 and as a part thereof. As shown in FIG. 5, when the membrane 18 is then in the opened half-shell state, a substantially closed annular body 42 is formed, which, as such, forms a cylindrical circumferential wall, along the outer circumference of which an adjacent tube portion 44 of the hose-like or tubular conduit portion 16 can be applied. In particular, in this manner, the free end of the conduit portion 16 can be securely connected to the tube portion 44 thus formed, for example welded to said portion, this being possible because the conduit portion 16 is also made from plastics materials suited to this purpose. For the associated fixing process, the free end face of the conduit portion 16 surrounds the tube portion 44 up to the upper free boundary edge 46 of the coupling element 10.

If the hand lever drive with the respective hand lever 34, 36 is then pivoted from its original position shown in FIG. 5 to its actuating position shown in FIG. 4, the membrane 18 assumes its closing position as shown in FIG. 4, in which the half-shell-shaped membrane 18 then comes into contact with the associated half-shell-shaped wall portion 40 of the coupling element 10; a clamping position, in which the free end or the free cross-section 15 respectively of the conduit portion 16 between the wall sections, which are opposite one another, of the membrane 18 and the wall portion 40 is now reduced to zero. In this clamping position, no product still contained inside the conduit portion 16 can pass via the coupling element 10 to the free side. As such, the transport route from the conduit portion 16 via the associated coupling element 10 of the coupling device is blocked.

As shown in FIG. 5, a coupling element 10 corresponding to FIG. 4 can be connected from beneath as a further coupling element 50 to a correspondingly arranged conduit portion 16 and membrane 18. In this manner, in an embodiment according to FIG. 5 with the two coupling elements 10, 50 of the same type, both one upper conduit portion and the illustrated lower conduit portion 16 according to the image shown in FIG. 4 can be synchronously sealed together or released again respectively by actuating the membrane 18 in each case.

However, as a general rule, it is also possible to use a standard connecting part instead of the coupling element 50, without any clamping device with membrane 18, in order to guarantee material transport in this manner, in which case only the upper coupling element 10 is able to seal the required transport route. In this respect, the coupling element 10 can also be connected to a machine discharge device, which is not shown in greater detail, with a conventional coupling if required. For the purpose of corresponding connection operations, the respective coupling element 10 comprises protrusions 54 on its lower and/or upper outer ring 52, which serve to attach a coupling ring 56 in the usual manner, said ring being illustrated in the closed state in FIG. 5 and for example consisting of two plastic halves that can be coupled together. In order to create a fluid-tight connection between the coupling elements 10, 50 in the coupled state, an elastomer sealing ring, which is not shown in greater detail, is inserted between the free end faces of the coupling elements 10, 50; however, it is also possible to injection mould such a seal on the end face of at least one of the coupling elements 10, 50.

In total, a coupling connection can be achieved with the solution according to the teachings herein which may also be referred to in technical jargon as a single-use containment interface. This is characterised in that a flexible conduit seal ending flush with the conduit end of the conduit portion 16 is created by means of the membrane 18, which, in the opened state, releases the entire nominal cross-section 15 of the conduit, for example in the form of a circular cross-section, as illustrated. This then does not protrude, either during the closing process (FIG. 3) or in the closed state (FIG. 4), over the original nominal cross-section 15 of the conduit. In particular, the membrane 18 with its film-like rectangular cross-sectional surface is held open or closed in the respective state, both in the open state shown in FIG. 1, 2, 5 and in the closed state shown in FIG. 4 by mechanical self-clamping on the coupling element 10.

The coupling system shown in FIG. 5, consisting of two conduit seals in the form of the illustrated coupling elements 10, 50, which are brought in contact with one another in a sealing manner in the respective state in which they are initially still closed and can then be opened and closed together by means of the respective lever drive 20, 22 while maintaining leaktightness to the outside, therefore has no parallel in the prior art.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, device, or other unit may be arranged to fulfil the functions of several items recited in the claims. Likewise, multiple processors, devices, or other units may be arranged to fulfil the function of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A coupling device, having at least one coupling element which comprises an actuating device that actuates a closure part, wherein a flexible conduit portion comprising a free cross-section can be connected to the coupling element;

the closure part, in a first actuated position, releases the free cross-section of the conduit portion and closes this cross-section in a further actuated position;

the closure part comprises a flexible membrane; and wherein the free cross-section of the conduit portion is cylindrical in the connection region with the coupling element in one actuating position and, in the other actuating position, using the actuating device, it assumes a closed shell shape, in which the wall portions of the conduit portion lie on top of another.

2. The coupling device of claim 1, wherein the flexible membrane can be actuated by the actuating device from the first actuated position after passing in a waveform manner through the inside of the coupling element into the further actuated position, which lies opposite the first actuated position.

3. The coupling device of claim 1, wherein the actuating device comprises at least one lever drive, which at least partially passes through the coupling element at one point and which comprises a fixing element that is pivotally articulated on the coupling element, said fixing element fixing the membrane on one free end thereof.

4. The coupling device of claim 3, wherein a second free end of the membrane is fixed on the inner circumferential side of the coupling element or on a further fixing element, which can be actuated in a pivotable manner with respect to the coupling element using a further lever drive, which at least partially passes through the coupling element.

5. The coupling device of claim 1, wherein the coupling element is configured as a hollow cylinder, wherein two recesses are provided in the cylinder wall, through each of which a hand lever of the actuating device passes in each actuating position, said lever being connected to an assignable plate-shaped fixing element, and wherein the two hand levers can be pivoted in opposition to move the membrane into both opposite actuating positions.

6. The coupling device of claim 1, wherein the membrane protrudes over a free end face of the coupling element in one direction to fix the conduit portion.

7. The coupling device of claim 1, wherein the free cross-section of the conduit portion in the connection region with the coupling element in the other actuating position assumes a half-shell shape.

8. The coupling device of claim 2, wherein the length of the membrane is selected such that it lies flat on the inside of the cylindrical coupling element in the respective actuated position after passing through the waveform.

9. A coupling system having two coupling devices; wherein each coupling device has at least one coupling element, which comprises an actuating device that actuates a closure part; wherein a flexible conduit portion comprising a free cross-section can be connected to the coupling element;

the closure part, in a first actuated position, releases the free cross-section of the conduit portion and closes this cross-section in a further actuated position;

the closure part comprises a flexible membrane; and wherein the free cross-section of the conduit portion is cylindrical in the connection region with the coupling element in one actuating position and, in the other actuating position, using the actuating device, it assumes a closed shell shape, in which the wall portions of the conduit portion lie on top of another.

10. The coupling system of claim 9, wherein the two coupling devices are detachably held onto one another in a sealed manner using a coupling ring that can be opened and closed.

11. The coupling system of claim 9, wherein the two coupling devices are identically configured.

12. The coupling system of claim 9, wherein the flexible membrane of at least a first of the two coupling devices can be actuated by the actuating device from the first actuated position after passing in a waveform manner through the inside of the coupling element into the further actuated position, which lies opposite the first actuated position.

13. The coupling system of claim 12, wherein the length of the membrane of at least a first of the two coupling devices is selected such that it lies flat on the inside of the cylindrical coupling element in the respective actuated position after passing through the waveform.

14. The coupling system of claim 9, wherein the actuating device of at least a first of the two coupling devices comprises at least one lever drive, which at least partially passes through the coupling element at one point and which comprises a fixing element that is pivotally articulated on the coupling element, said fixing element fixing the membrane on one free end thereof.

15. The coupling system of claim 14, wherein a second free end of the membrane of at least a first of the two coupling devices is fixed on the inner circumferential side of the coupling element or on a further fixing element, which can be actuated in a pivotable manner with respect to the coupling element using a further lever drive, which at least partially passes through the coupling element.

16. The coupling system of claim 9, wherein the coupling element of at least a first of the two coupling devices is configured as a hollow cylinder, wherein two recesses are provided in the cylinder wall, through each of which a hand lever of the actuating device passes in each actuating position, said lever being connected to an assignable plate-shaped fixing element, and wherein the two hand levers can be pivoted in opposition to move the membrane into both opposite actuating positions.

17. The coupling system of claim 9, wherein the membrane of at least a first of the two coupling devices protrudes over a free end faces of the coupling element in one direction to fix the conduit portion.

18. The coupling system of claim 9, wherein the free cross-section of the conduit portion of at least a first of the two coupling devices in the connection region with the coupling element in the other actuating position assumes a half-shell shape.

* * * * *